Dec. 2, 1947.    L. F. THIRY    2,432,050
ENERGY DISSIPATING ANTIVIBRATION DEVICE
Filed Nov. 9, 1943    2 Sheets-Sheet 1

INVENTOR.
Leon F. Thiry.
BY
Harness, Dickey & Pierce
ATTORNEYS.

Dec. 2, 1947.    L. F. THIRY    2,432,050
ENERGY DISSIPATING ANTIVIBRATION DEVICE
Filed Nov. 9, 1943    2 Sheets-Sheet 2
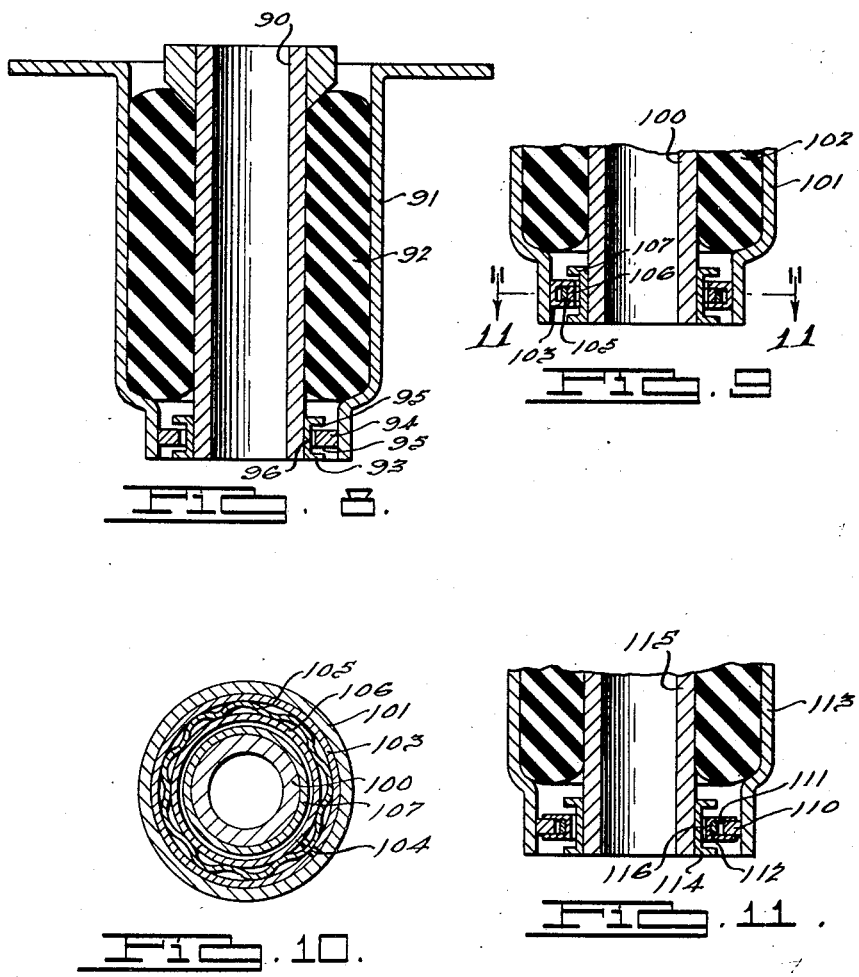
INVENTOR.
Leon F. Thiry.
BY
Harness, Dickey & Pierce
ATTORNEYS.

Patented Dec. 2, 1947

2,432,050

UNITED STATES PATENT OFFICE 2,432,050

ENERGY DISSIPATING ANTIVIBRATION DEVICE

Leon F. Thiry, Montclair, N. J., assignor to The General Tire & Rubber Company, Akron, Ohio, a corporation of Ohio Application November 9, 1943, Serial No. 509,584

8 Claims. (Cl. 248—358)

1

The present invention relates to vibration mountings of the type employing a pair of relatively rigid members connected by resilient rubber or rubber-like material.

Mountings of this type are employed to support members subject to vibration in order to permit them to float relative to the member on which they are supported. In general, such mountings are subject to the defect that at certain frequencies the amplitude of vibration of the supported member with respect to the supporting member becomes excessive. These excessive vibrations build up when the induced period of vibration corresponds with the natural period of vibration of the supported body.

Accordingly, it is the general object of the present invention to incorporate in a mounting of the type mentioned means for dissipating a portion of the energy of the vibrating member and, consequently, dampening the vibration to a sufficient degree to prevent its amplitude from becoming excessive.

Another object of the present invention is to provide a mounting incorporating a vibration dampening means effective to dampen vibrations in one direction without interfering with relative vibrations in a plane at right angles to the first direction.

Another object of the invention is to provide a mounting incorporating vibration dampening means effective to dampen vibrations in one plane and also in a direction at right angles to that plane.

Another object of the present invention is to provide a mounting incorporating vibration dampening means which will be effective only after the amplitude of vibration exceeds a predetermined amount and which, therefore, does not in any way interfere with the vibration of small amplitudes.

Another object of the present invention is to provide a self-contained mounting incorporating a liquid type of vibration dampener.

Other objects and advantages of the invention, which include the provision of energy dissipating vibration mountings of improved and simplified construction, will become apparent from the following specification, the drawings relating thereto, and from the claims hereinafter set forth.

In the drawings, in which like numerals are used to designate like parts in the several views throughout:

Figure 1 is a longitudinal section taken through

2 a mounting incorporating one form of the invention;

Figure 8 illustrates a further modification in which an energy absorbing device of the general type illustrated in Figure 4 is incorporated in a vibration mounting of the type shown in Figure 1;

Figure 9 is a fragmentary section of a modified form of the mechanism illustrated in Figure 8;

Figure 10 is a transverse section taken on the line 11—11 of Figure 9; and

Figure 11 illustrates a further modification of the construction of Figure 8.

Figure 1:
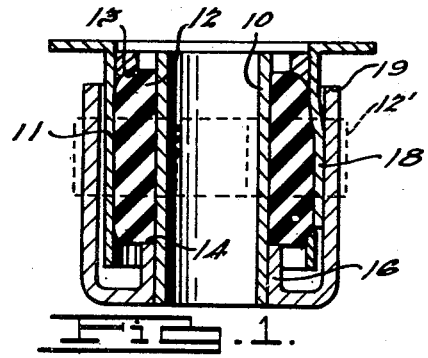
Figure 2:
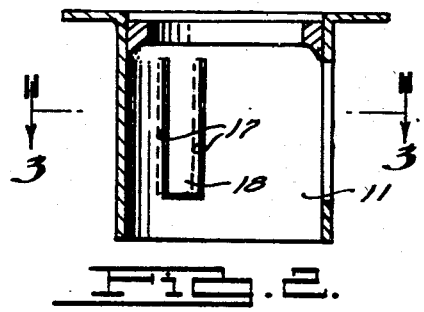
Figure 2 is a section taken on the line 2—2 of Figure 3 through one element of the mounting.

Referring to Figure 1, there is illustrated a vibration mounting constructed of a pair of coaxial members 10 and 11, which, in the particular form shown, are concentric tubular members having an annular space therebetween in which is located an annular ring of molded rubber or rubber-like material 12 under a state of distortion due to radial compression and consequent axial elongation. The free state of the annular rubber ring 12 is illustrated by the dotted lines 12' in Figure 1, and the ring is inserted within the space between the tubular members 10 and 11 in any desired manner, such as that set forth in the patent to Leon Thiry, No. 1,739,270. The resulting tendency of the rubber ring 12 to return to its normal state exerts sufficient pressure on the walls of the tubular members 10 and 11 to prevent slippage.

The particular mounting illustrated in Figure 1 is designed to support a vibrating member whose weight is acting vertically downward on the outer tubular member 11, as viewed in the drawing, and, consequently, there is provided a shoulder 13 at the upper end of the tubular member 11 and a shoulder 14 at the lower end of the tubular member 10. The shoulders 13 and 14 bear against the ends of the rubber ring 12 and assist in holding it against displacement downwardly with respect to the member 10 or upwardly with respect to the member 11. The shoulder 13 is formed as a ring press-fitted within the member 11, but may be formed integrally with the tubular member 11, if desired, while the shoulder 14 is formed by a sleeve 16, which is press-fitted on the lower end of the tubular member 10 after the ring 12 is assembled in the position illustrated.

In accordance with the present invention, the outer tubular member 11 is formed of relatively thin flexible material and is provided intermediate its ends with three pairs of longitudinal slots 17 forming, at points equally spaced about its periphery, three longitudinal tongues 18 which, due to the pressure exerted thereon by the rubber ring 12, are bent outwardly, as best shown at the right-hand side of Figure 1. The sleeve 16 has formed integrally therewith an outer elongated sleeve 19, which surrounds the tubular member 11 and is resiliently engaged by the three tongues 18. As a result of this arrangement, upon vibration of the tubular member 11 axially with respect to the tubular member 10 the tongues 18 will frictionally slide upon the inner surface of the sleeve 19 and the energy absorbed by the frictional engagement will be effective to dampen the vibrations and thus prevent them from building up to excessive amplitude at resonance frequencies. Since the tongues 18 are relatively thin and resilient, they may be compressed radially with respect to the outer tubular member 11 and, consequently, they will not prevent limited radial vibration of the outer member with respect to the inner tubular member 10. In this type of mounting the amplitude of radial vibration is materially less than that of the axial vibration and, consequently, the mounting is so positioned that the principal vibration to be absorbed is in a direction axially with respect to the tubular member 10.

It will be appreciated that the rubber ring 12 may be bonded, if desired, to the tubular members 10 and 11, and that in such case it may be molded to final form, rather than being in a state of distortion in the assembled mounting. In this event, the tongues 18 may be bent outwardly and, by reason of their own resilience, press against sleeve 19. Moreover, if the forces acting upon the outer tubular member 11 in the upward direction equal those acting in the downward direction, additional abutments similar to the abutments 13 and 14 may be provided on the upper end of the tubular member 10 and the lower end of the tubular member 11; the latter abutment, however, should not interfere with the outward deflection of the tongues 18.

While the tongues 18 are shown as formed integrally with the outer tubular member 11, it will be apparent that they may be formed of separate resilient strips fixed at their upper ends to the member 11 in any desired manner, as by welding or brazing, in which event the pressure they exert upon the sleeve 19 will be solely the result of their own spring tension.

Figure 4:
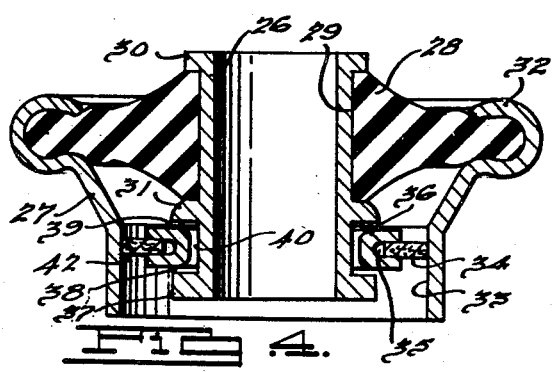
Figure 4 shows a different form of mounting incorporating vibration dampening means effective to dampen vibration in one plane and also in a direction at right angles to that plane.
Figure 3:
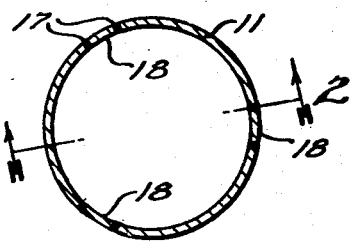
Figure 3 is a transverse section taken on the line 3—3 of Figure 2.

In Figure 4 is illustrated a different form of vibration mounting comprising a pair of coaxial members 26 and 27 having an annular space therebetween. The inner member 26 is in the form of a tube adapted to be connected to one of the vibrating bodies and the outer member 27 is adapted to be connected to the other body, one of the bodies being the support and the other the supported body. In this form, the members 26 and 27 are connected by means of a more or less disc-shaped, resilient, molded rubber ring 28, which is molded to final form and bonded in any suitable manner to the tubular member 26 at 29. The member 26 is preferably provided with shoulders 30 and 31 to assist in retaining the rubber ring 28 against axial displacement with respect to the tubular member 26. The outer periphery of the rubber ring 28 is connected to the outer annular member 27 in any desired manner, such as by crimping the periphery within the upper edge 32 of the member, as illustrated in Figure 4.

As an alternative construction, the free molded state of member 28 may correspond to that illustrated except that the central opening and outer diameter of the member are materially smaller than in the assembled unit. In such case, the member 28 is stretched over the member 26 and its natural tension will serve to retain it in place. The stretching of the member 28 will reduce its axial thickness at the center and, therefore, the axial thickness in the free state must also be greater than in the assembled state illustrated. When the opening in member 28 shrinks onto member 26, the thickness of the member will increase slightly and thus cause the top and bottom surfaces to abut solidly against shoulders 30 and 31. After member 28 is assembled on member 26, member 28 is squeezed between axially moving dies in order to increase its outer diameter, and while so distorted its periphery is crimped at 32 within the member 27. This results in placing member 28 in radial tension in the assembled unit. It will be appreciated that if this method of forming the mounting is employed, the cylindrical portion 33 of member 27 must be made sufficiently large to receive the lower die member for compressing member 28.

The type of mounting shown in Figure 4 permits a relatively large amplitude of vibration of the member 26 axially with respect to the member 27 and also permits angular or conical displacement of the member 26 of substantial amplitude with respect to the member 27. A limited pure radial displacement is also permitted.

As best shown in Figure 4, the lower end of the annular member 27 is provided with an internal cylindrical surface 33 coaxial with the mounting. The surface 33 is frictionally engaged by a ring 34, which may be formed of any desired material, such as a molded plastic or a plastic impregnated fabric of the type used in brake linings. The inner edge of the ring 34 is received within a radially opening, annular slot 35 in an annular ring 36. The width of the slot 35 is such that the sides of the slot frictionally engage the opposite sides of the ring 34 and the depth of the slot is such that relative displacement of the ring 36 may occur relative to the ring 34 in any direction in the plane of the ring 34. Ring 36 is preferably formed of sheet metal and its inherent resilience relied upon to lightly grip the ring 34. The ring 36 may be connected to the inner tubular member 26 in any desired manner, so that axial movement of the tubular member 26 relative to the member 27 will cause a sliding of the ring 34 on the cylindrical surface 33 and radial or conical displacements of the lower end of the tubular member 26 will cause a radial displacement and frictional sliding of the ring 36 with respect to the ring 34, thus frictionally dampening both forms of displacement. The particular connection illustrated comprises the previously mentioned shoulder 31 and a similar shoulder 37 formed on the lower end of the tubular member 26, the shoulders 31 and 37 embracing the ring 36 and thus being adapted to displace the ring 36 axially. Radial displacements of the lower end of the tubular member 26 result in an engagement of the member 26 with the inner surface of the ring 36 and cause radial displacements of the latter relative to the ring 34.

The connection between the ring 36 and the tubular member 26 just described is arranged to provide a lost motion in order that vibrations of a limited amplitude will not be dampened or interfered with in any manner. This lost motion is achieved by providing a gap 38 in the upper surface of shoulder 37 and the lower surface of the ring 36 and a corresponding gap 39 between the lower surface of shoulder 31 and the upper surface of the ring 36. There is also provided a gap 40 between the inner surface of the ring 36 and the outer surface of the tubular member 26. The width of these gaps may be adjusted to provide any desired amplitude of either axial or conical vibration without any dampening effect, in which event the vibration dampening action will only occur when the amplitude of vibration exceeds a predetermined amount. If it is desired to dampen all vibrations, the gaps 38, 39 and 40 will, of course, be reduced to zero. It will be noted that the outer periphery 42 of the ring 34, as viewed in Figure 4, is curved about an axis passing through the axis of the mounting and, consequently, is of spherical configuration in order to permit angular displacement of the plane of the ring 34 with respect to a plane passing transversely to the axis of the cylindrical surface 33 without any binding of the ring 34 on the surface 33. It will be appreciated that the shoulder 37 on member 26 may be made as a separate ring press-fitted or welded in place after the rings 34 and 36 are assembled, if so desired.

If desired, the friction ring 34 may be split so that it can expand into contact with wall 33. In this event, a sinuous backing spring, such as that employed to expand piston rings, may be employed in the bottom of slot 35 to expand ring 34.

When it is unnecessary to dampen conical or radial vibration, rings 34 and 36 may be replaced by a single ring, which may be either a molded ring of friction material or a split spring ring that expands by its own resiliency into contact with wall 33.

It will be understood that any of the dampening devices shown and described in connection with Figure 4 may be employed in a mounting of the type shown in Figure 1.

Figure 5:
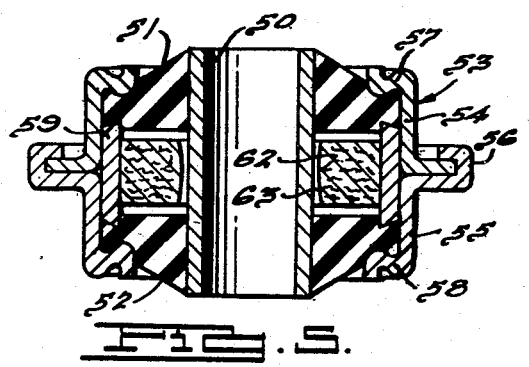
Figure 5 is a view of a further form of the invention comprising a mounting having a vibration dampening means sealed within the same.

In Figure 5 is illustrated a further modified form of mounting comprising coaxial members 50 and 53 having an intermediate annular space in which is positioned a pair of annular rubber members 51 and 52 located at opposite ends of the member 50. The rubber members 51 and 52 are bonded or otherwise fixed to the inner member 50. The outer member is made up of two pieces, 54 and 55, crimped together at 56. The outer peripheries of the annular rubber rings 51 and 52 are crimped between inwardly extending flanges 57 and 58 on the members 54 and 55, respectively, and the extremities of a sleeve 59, which is fitted within the members 54 and 55. This type of mounting provides a relatively high amplitude of vibration of the member 50 in an axial direction with respect to the outer member 53 and a more limited radial or conical displacement of the member 50 with respect to the member 53.

The vibration dampening means in the modification of Figure 5 comprises a ring 62, which frictionally engages the inner wall of the sleeve 59 and which has an inner curved surface 63 spaced slightly from the walls of the inner tubular member 50. The surface 63 is curved to prevent interference with the tubular member 50 on conical displacements of that member relative to the member 53. The ring 62 may be formed of any desired material, such as Bakelite or other plastic material or the type of molded material employed in brake linings.

It will be observed that the axial thickness of the ring 62 is less than that of the distance between rubber members 51 and 52 and, consequently, the ring will have no effect upon axial vibrations of limited amplitude between the members 50 and 53. However, in the event that the member 50 is displaced downwardly in an axial direction relative to the member 53 to a sufficient extent to permit the inner portion of the lower surface of the rubber ring 51 to engage the upper surface of the ring 62, any further downward movement of the member 50 will cause a sliding of the ring 62 upon the inner surface of sleeve 59, with the result that the friction will absorb sufficient energy to dampen the vibration. The same action occurs in a reverse direction by contact of the inner top portion of rubber member 52 with the lower surface of the ring 62. It is apparent, therefore, that the ring is effective to dampen all vibrations above a predetermined amplitude.

Figure 6:
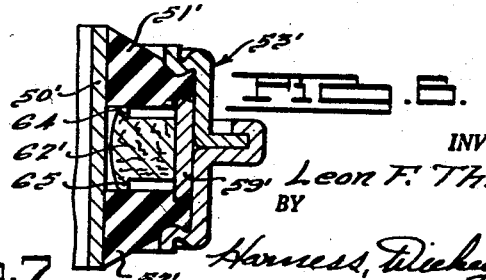
Figure 6 is a fragmentary view of a slightly modified form of the invention shown in Figure 5.

It will be observed that the amount of free play provided in the mounting of Figure 5 is determined by the space between the ring 62 and the rubber members 51 and 52, and that it may be varied as desired so long as the outer edge of the ring 62 is free to slide axially within the sleeve 59. Thus, in Figure 6 is shown a fragmentary view of a further modification similar to the construction of Figure 5 except that the friction ring 62' is provided with a pair of annular flanges 64 and 65 at its inner edge, which rims project into contact with the inner portions of the rubber members 51' and 52'. It will be apparent from this form of the invention that all the vibratory movements of the inner tubular member 50' relative to the outer annular member 53' will be dampened by the energy required to frictionally slide the ring 62 on the sleeve 59'. Instead of having the flanges 64 and 65 contact the rubber members 51' and 52', they may be spaced from the rubber members to any desired degree.

Figure 7:
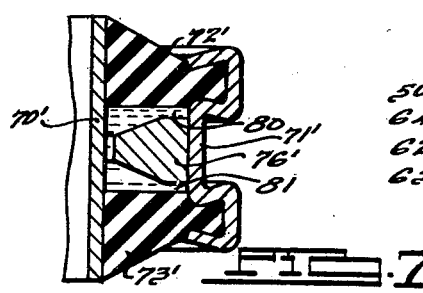
Figure 7 is a fragmentary view of a further modified form of the invention and is similar to Figure 5 but incorporates a fluid type of energy dissipating mechanism and means to permit relatively free vibration for a limited amplitude.

Shown in Figure 7 is a mounting which is broadly of the self contained type illustrated in Figures 5 and 6, but which employs a fluid as well as friction for damping vibration. In this construction the mounting comprises an outer rigid member 71' having a portion with an annular opening therein, an inner rigid element 70' having a portion with an outer annular surface coaxial with the opening in the outer element. The rubber members 72' and 73' are bonded or secured in any suitable manner to the inner element 70' and the outer peripheries are crimped within the outer element 71'. Since the rubber members 72' and 73' are connected with both the inner and outer elements, relative movement of said elements is permitted only during distortion of the rubber members. Positioned within the space between the inner and outer elements 70' and 71' and between the annular rubber members 72' and 73' is an annular ring 76' which is freely slidable upon the outer annular member 71' to a limited degree determined by the gaps 80 and 81 between the annular members 76' and the rubber members 72' and 73'.

The annular member 76' tapers in thickness toward the center in order that it will not interfere with axial movements of the inner rigid member 70' and the inner portions of the rubber members 72' and 73' relative to the outer annular elements 71'. The remaining space within the unit is substantially completely filled with a fluid indicated by the dotted lines. The degree of damping effect may be determined as desired by the size of the gap between the annular member 76' and the inner tubular member 70' and by the viscosity of the fluid employed.

As a result of this arrangement, when the tubular member 70' moves downwardly the compression of the fluid above the annular member 76' by the upper rubber member 72' will cause the annular member 76' to move downwardly without materially restricting the relative movement until the annular member 76' contacts the lower rubber member 73'. Thereafter, further downward movement of the inner tubular member 70' will be dampened by the restriction offered by the member 76' to the flow of fluid from the upper side thereof to the lower. The action of the mounting on reverse movement is the same except in the reverse direction.

In Figure 8 is illustrated a mounting of the general type illustrated in Figure 1, incorporating a pair of coaxial members, including an inner sleeve 90, an outer sleeve 91 and an intermediate annular ring of rubber 92. The sleeves 90 and 91 project beneath the lower end of the rubber ring and are spaced apart to receive an energy dissipating device comprising an annular stamping 93, which is generally U-shaped in cross section and is press-fitted on the inner sleeve 90, and a split spring ring 94. The ring 94 is made of any suitable spring material, such as steel or spring bronze, and is split radially at one point around its circumference in the manner of a conventional piston ring. The construction of the ring 94 is such that it presses against the internal surface of the outer sleeve 91 by its own resiliency.

As is apparent from Figure 8, the internal diameter of the ring 94 is less than the outside diameters of the flanges on the U-shaped ring 93, in consequence of which on axial movement of the inner sleeve 90 with the ring 93 relative to the outer sleeve 91 the flanges of the ring 93 will engage the ring 94 and shift it axially along the sleeve 91. The friction generated between the ring 94 and the sleeve 91 will dampen the vibration.

The particular energy absorbing device illustrated in Figure 8 incorporates a space 95 between the flanges of the ring 93 and the ring 94, with the result that limited axial oscillations of the sleeve with reference to the sleeve 91 are not dampened. This permits the vibration mounting to operate freely to a limited degree. It is apparent that the axial width of the space 95 may be varied as desired, and if no free movement is desired the space may be entirely eliminated.

It will be noted that there is a space 96 between the inside of the ring 94 and the bottom of the channel in the ring 93. This space must be sufficient to permit full radial displacement of the inner sleeve 90 with reference to the outer sleeve 91 without contact between the rings 93 and 94. It may be noted that the energy dissipating device of Figure 8 does not incorporate means to dampen radial vibrations, and in this respect differs from the construction of Figure 4.

One important advantage of the type of mechanism illustrated in Figure 8 is that the rings 93 and 94 may be assembled as a unit and as a unit installed within a vibration mounting of conventional design, where desired, by simply press-fitting the annular channel 93 on the inner sleeve 90.

In Figures 9 and 10 is illustrated a further modification of the structure illustrated in Figure 8, differing from the latter primarily in the fact that the split ring is formed of a suitable friction material, such as molded Bakelite or molded brake lining material, and is pressed against the outer sleeve by means of a sinuous spring.

Referring to Figures 9 and 10, the mounting, as in the case of Figure 8, comprises an inner sleeve 100 and an outer sleeve 101 separated by an annular ring of rubber 102. The energy absorbing device comprises an annular ring 103, of molded friction material in the form of an inwardly opening U-shaped channel section. The ring 103 is split in the manner described in connection with Figure 8, as best indicated at 104 in Figure 10.

Positioned within the channel formed in the ring 103 are a sinuous spring 105 and a backing ring 106. Since the backing ring 106 is not split, it is apparent that the sinuous spring exerts a force tending to separate the ring 106 and the friction ring 103, thus forcing the friction ring against the outer sleeve 101. Consequently, the assembly of the rings 103 and 106 and the spring 105 functions in the same manner as the split ring 94 of Figure 8. The mechanism of Figures 9 and 10 also incorporates a press-fitted annular channel member 107, which is similar in construction and mode of operation to the annular channel 93 of Figure 8.

The type of energy absorbing device illustrated in Figures 9 and 10 may be further modified, as shown in Figure 11, by employing a split ring 110 of molded friction material, which is fitted within an outwardly opening, annular channel member 111. The inner wall of the ring 110 is spaced from the bottom of the channel formed in the member 111, and within that space is positioned a sinuous spring 112 identical in construction and mode of operation to the spring 105 shown in Figures 9 and 10. It will be apparent that since the annular channel member 111 is continuous and unbroken, the sinuous spring 112 will tend to force the split friction ring 110 against the inner surface of the outer sleeve 113 of the mounting.

As in Figures 8 and 9, an outwardly opening, annular channel member 114 is press-fitted on the inner sleeve 115 of the mounting and serves, on axial oscillation of the inner sleeve relative to the outer sleeve, to shift the rings 111 and 110 axially with respect to the outer sleeve 113 and thus dampen the vibration. The axial space between the flanges of the ring 114 and the ring 111 may be eliminated if it is not desired to permit any undampened axial oscillation.

It will be noted that the vibration mounting of Figure 11 is also adapted to dampen radial vibrations of the inner sleeve relative to the outer sleeve by reason of the frictional contact between the inner sides of the channel 111 and the ring 110. If it is desired to dampen all radial vibrations, the annular space 116 between the bottom of the channel in ring 114 and the ring 111 may be eliminated.

While several forms of the invention are disclosed herein, it will be apparent that other modifications thereof are available within the spirit of the invention and within the scope of the appended claims.

What is claimed is:

1. A vibration mount including a pair of relatively rigid elements connected by a resilient member and means for dampening relative vibrations between said elements, the connection between said damping means and one of said elements being sufficiently loose to permit limited relative movement between said element and said damping means during which movement no damping is effected, whereby limited vibrations are not dampened.

2. A vibration mount including a pair of relatively rigid elements connected by a resilient member and means for dampening relative vibrations between said elements, said means being in frictional contact with one of said elements and the connection to the other element and said damping means being sufficiently loose to permit limited relative movement between said element and said damping means during which movement no damping is effected, whereby limited vibrations are not dampened.

3. A vibration mount including a pair of coaxial elements, one positioned within the other with an annular space therebetween, a pair of axially spaced flexible annular rubber members between and connecting said elements and defining with the elements an annular closed chamber, an annular member within said space in frictional contact with one of said elements, and means movable with the other element for moving said last mentioned member axially relative to said one element.

4. A vibration mount including a pair of coaxial elements, one positioned within the other with an annular space therebetween, a pair of axially spaced flexible annular rubber members between and connecting said elements and defining with the elements an annular closed chamber, an annular member within said space in frictional contact with one of said elements, and means movable with the other element for moving said last mentioned member axially relative to said one element, said means having a lost motion connection with said last mentioned member.

5. A vibration absorbing mounting comprising an outer rigid element having a portion with an inner annular opening therein, an inner rigid element having a portion with an outer annular surface disposed substantially coaxially within said annular opening of said outer element, said elements being connected together and spaced by an annular resilient member having a portion disposed in a coaxial space between said inner and outer rigid elements to permit relative axial movement of said elements only through shear distortion of said resilient member, and means for damping relative vibrations in an axial direction between said elements, said means being in frictional contact with one of said elements and being moved by relative movement of said elements.

6. A vibration absorbing mounting comprising an outer rigid element having a portion with an inner annular opening therein, an inner rigid element having a portion with an outer annular surface disposed substantially coaxially within said annular opening of said outer element, said elements being connected together and spaced by an annular resilient member having a portion disposed in a coaxial space between said inner and outer rigid elements to permit relative axial movement of said elements only through shear distortion of said resilient member, and radial damping means for damping relatively large vibrations between said elements in a radial direction, an axial damping means for damping relatively large vibrations between said elements in an axial direction, said radial damping means being frictionally carried by one of said elements being connected to the other of said elements, the connection being sufficiently loose to permit limited relative radial movements of said elements during which no damping is effected by said radial damping means.

7. A vibration absorbing mounting comprising an outer rigid element having a portion with an inner annular opening therein, an inner rigid element having a portion with an outer annular surface disposed substantially coaxially within said annular opening of said outer element, said elements being connected together and spaced by an annular resilient member having a portion disposed in a coaxial space between said inner and outer rigid elements to permit relative axial movement of said elements only through shear distortion of said resilient member, and radial damping means for damping relatively large vibrations in a radial direction between said elements, said radial damping means being carried by one of said elements and being loosely connected to the other of said elements, the connection between one of said elements being sufficiently loose to permit limited relative movements in a radial direction between said elements during which no damping is effected by such damping means.

8. A vibration absorbing mounting comprising an outer rigid element having a portion with an inner annular opening therein, an inner rigid element having a portion with an outer annular surface disposed substantially coaxially within said annular opening of said outer element, said elements being connected together and spaced by an annular resilient member having a portion disposed in a coaxial space between said inner and outer rigid elements to permit relative axial movement of said elements only through shear distortion of said resilient member, and radial damping means for damping relatively large vibrations between said elements in a radial direction and axial damping means for damping relatively large vibrations in an axial direction, said axial damping means having frictional contact with one of said elements and connected to be moved by relative movement of the other element, the connection between said axial damping means and one of said elements being sufficiently loose to permit limited relative movements of said elements in an axial direction during which no damping is effected by said axial dampng means.

LEON F. THIRY.

REFERENCES CITED

The following references are of record in the file of this patent:

UNITED STATES PATENTS

| Number | Name | Date |
|---|---|---|
| 2,179,959 | Schroedter | Nov. 14, 1939 |
| 2,273,869 | Julien | Feb. 24, 1942 |
| 2,295,829 | Carlson | Sept. 15, 1942 |
| 2,130,939 | Williams | Sept. 20, 1938 |
| 2,355,829 | Tyler | Aug. 15, 1944 |